(12) United States Patent
Oveyssi et al.

(10) Patent No.: US 6,594,111 B1
(45) Date of Patent: Jul. 15, 2003

(54) SPINDLE MOTOR HAVING STATOR RIM FORMED OF CURVED ARC SEGMENTS

(75) Inventors: Kamran Oveyssi, San Jose, CA (US); Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 177 days.

(21) Appl. No.: 09/920,576

(22) Filed: Jul. 31, 2001

(51) Int. Cl.[7] .............................................. G11B 17/02
(52) U.S. Cl. ...................... 360/99.08; 310/43; 310/254
(58) Field of Search .......................... 360/98.07, 99.04, 360/99.08; 310/43, 67 R, 254

(56) References Cited

U.S. PATENT DOCUMENTS 4,837,474 A  *  6/1989  Petersen et al. ............ 310/254
5,519,270 A  *  5/1996  Yamada et al. ............ 310/67 R
5,742,450 A  *  4/1998  Moser ...................... 360/99.08

* cited by examiner

Primary Examiner—A. J. Heinz
(74) Attorney, Agent, or Firm—Won Tae C. Kim, Esq.; Milad G. Shara, Esq.; Stetina Brunda Garred & Brucker

(57) ABSTRACT

A spindle motor for use in a disk drive has a spindle motor hub having an axis of rotation, an annular magnet element coupled to the spindle motor hub, and a spindle motor stator. The spindle motor stator has a stator rim formed of a plurality of adjacent arc segments. The arc segments each respectively has opposing curved ends extending parallel to the axis of rotation. The curved ends of respective adjacent arc segments cooperatively form a plurality of stator teeth in operable communication with the magnet element for rotating the spindle motor hub. The spindle motor stator has a plurality of windings distributed along the stator rim. The windings each have a winding axis parallel to the axis of rotation and being disposed about respective ones of the stator teeth.

20 Claims, 5 Drawing Sheets

SPINDLE MOTOR HAVING STATOR RIM FORMED OF CURVED ARC SEGMENTS

CROSS-REFERENCE TO RELATED APPLICATIONS

This application is related to U.S. Application Ser. No. 09/920,580, filed Jul. 31, 2001, and entitled "Spindle Motor Having Stator Rim Formed of Concentric Laminate Layers."

BACKGROUND OF THE INVENTION

1. Field of the Invention

The present invention relates generally to spindle motors for use in disk drives, and more particularly to a spindle motor having a stator rim formed of curved arc segments.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA) having an actuator assembly having at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which that extend from an opposite side of the actuator body. A head gimbal assembly includes at least one transducer head, sometimes two, which is distally attached to each of the actuator arms. The actuator assembly includes the actuator body that has a bore and a pivot-bearing cartridge engaged within the bore. The at least one head gimbal assembly and the flex circuit cable assembly are attached to the actuator assembly.

The spindle motor includes a hub that is rotatably attached to the disk drive base. The hub has an outer flange that supports one of the disks. Additional disks may be stacked and separated with spacers. The spindle motor further includes an annular magnet element and a spindle motor stator. Where space efficiency is of vital concern, the magnet element is typically attached about the lowermost portion of the hub below the flange. The magnet element consists of a predetermined number of N and S poles that are disposed alternately circumferentially about the magnet element. The spindle motor stator includes an outer stator rim that is attached to the disk drive base and a plurality of internally facing stator teeth. The stator teeth are equally spaced and extend from the stator rim. The spindle motor stator is sized to fit about the hub and in particular the magnet element. Windings are oriented vertically about each of the stator teeth. The windings selectively conduct current to create a magnetic field that interacts with the various poles of the magnet element. Such interaction results in forces applied to the hub which tend to rotate the hub. In those disk drives capable of reading both sides of the disks, the head stack assembly includes an actuator arm that extends and pivots between the vertical region between the lowermost disk and the spindle motor stator.

A topic of concern is the desire to reduce the overall disk drive size. Such disk drives may have a variety of applications such as in hand held or portable electronic devices. The exterior size and shape of the disk drive is often referred to as a "form factor." Reduction of such disk drive form factor has proven challenging. This is because the mere reduction of the size of the various disk drive components may result in such components being unable to conform to required specifications.

One particular area of focus is the reduction of the height of the disk drive. As mentioned above, a prior art arrangement includes a lower actuator arm which extends and pivots between the vertical region between the lowermost disk and the spindle motor stator. Such prior arrangement is contemplated to be a limited factor in the overall sizing of the disk drive height. The mere reduction in vertical sizing of the spindle motor and its magnet element would directly reduce the total flux associated with the spindle motor which may be below acceptable specifications. Accordingly, there is a need in the art for a reduced height-to-diameter ratio spindle motor configuration which generates sufficient torque to meet acceptable specifications in comparison to the prior art.

SUMMARY OF THE INVENTION

An aspect of the invention can be regarded as a spindle motor for use in a disk drive. The spindle motor includes a spindle motor hub having an axis of rotation. The spindle motor further includes an annular magnet element coupled to the spindle motor hub. The spindle motor further includes a spindle motor stator. The spindle motor stator includes a stator rim formed of a plurality of adjacent arc segments. The arc segments each respectively has opposing curved ends extending parallel to the axis of rotation. The curved ends of respective adjacent arc segments cooperatively form a plurality of stator teeth in operable communication with the magnet element for rotating the spindle motor hub. The spindle motor stator fturther includes a plurality of windings distributed along the stator rim. The windings each have a winding axis parallel to the axis of rotation and being disposed about respective ones of the stator teeth.

In an embodiment, each of the stator teeth has a magnetic flux surface disposed with the associated winding axis extending orthogonally from each magnetic flux surface. The magnet element may be disk-shaped. In another embodiment, each of the stator teeth has a magnetic flux surface with the associated winding axis extending parallel to each magnetic flux surface. The magnet element may be disposed concentrically about the stator teeth or the stator teeth may be disposed cooperatively about the magnet element. The magnet element may further be cylindrical-shaped or ring-shaped. Each of the arc segments may be formed of at least two laminate layers, and the laminate layers are stacked along the axis of rotation.

In additional embodiments of the present invention, there are provided disk drives each having a disk drive base. The above-mentioned spindle motors may be included the disk drives as attached to the disk drive bases.

DESCRIPTION OF THE PREFERRED EMBODIMENTS

Figure 1:
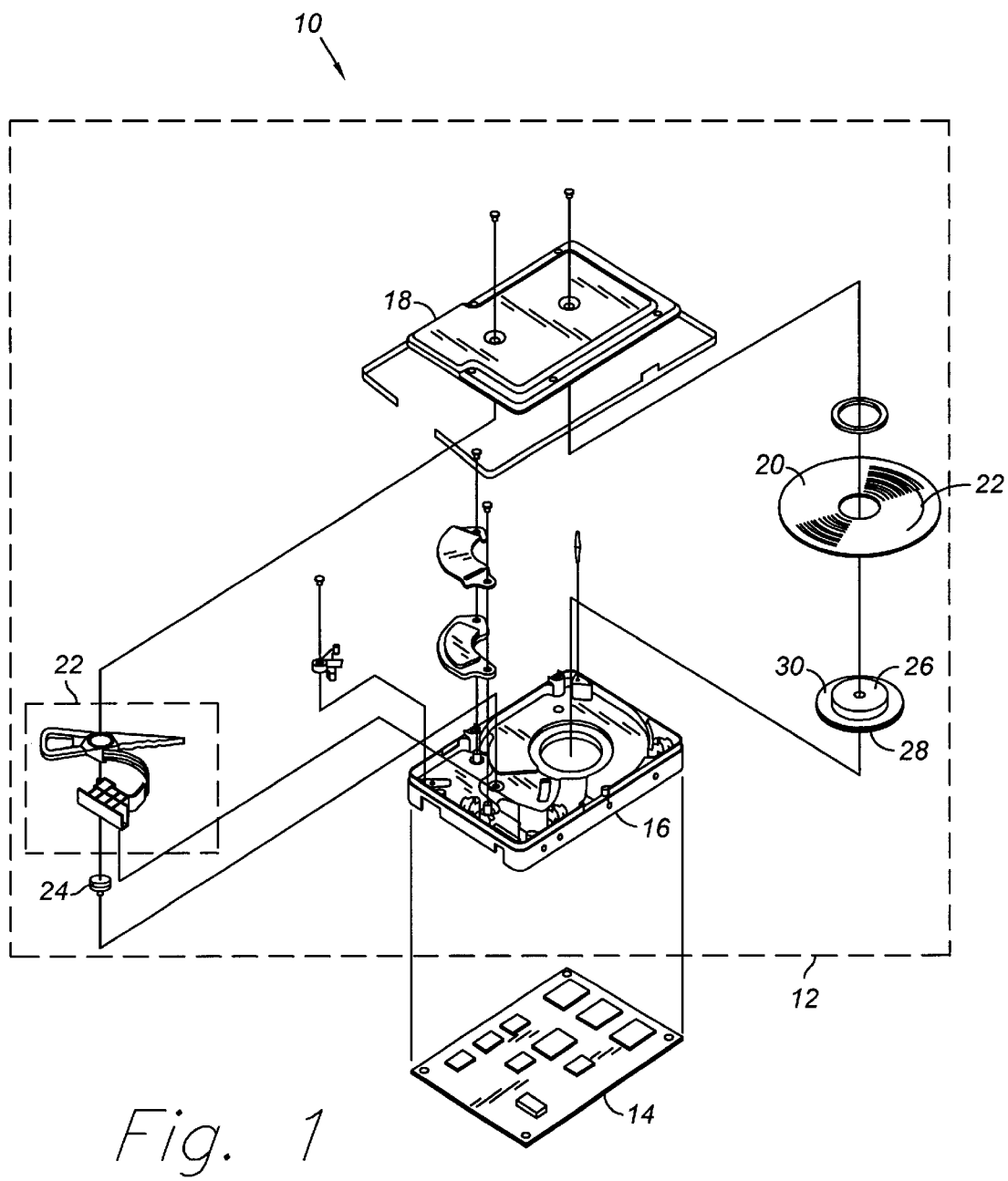
FIG. 1 is an exploded perspective view of a disk drive including a spindle motor as constructed in accordance with the present invention.
Figure 2:
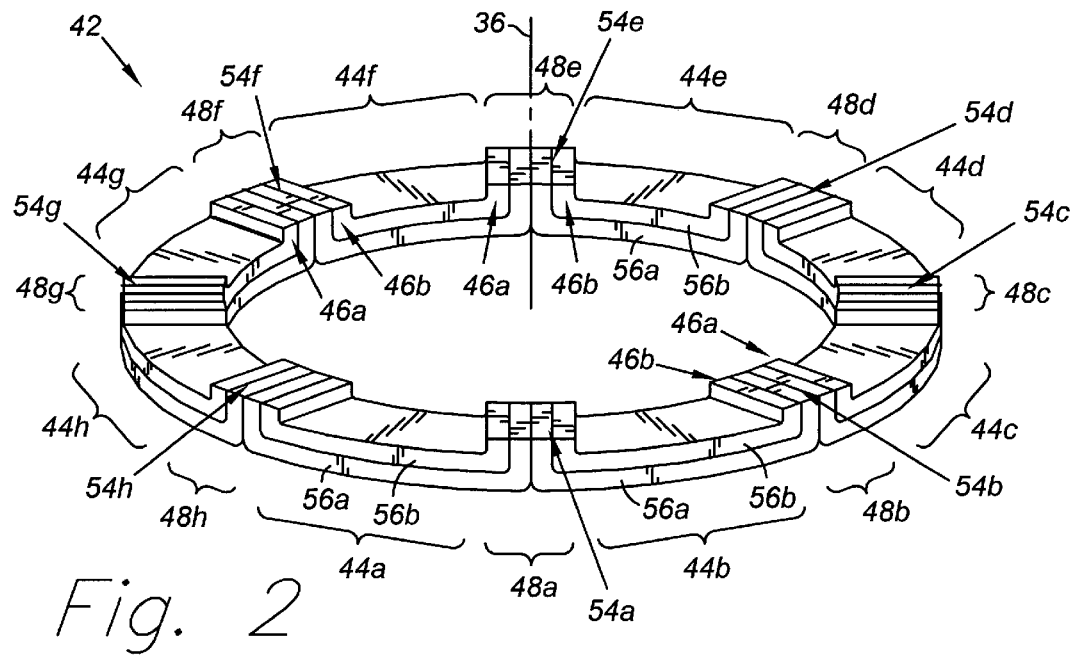
FIG. 2 is a perspective view of a stator rim having a plurality of curved arc segments as constructed in accordance with an aspect of the present invention.
Figure 3:
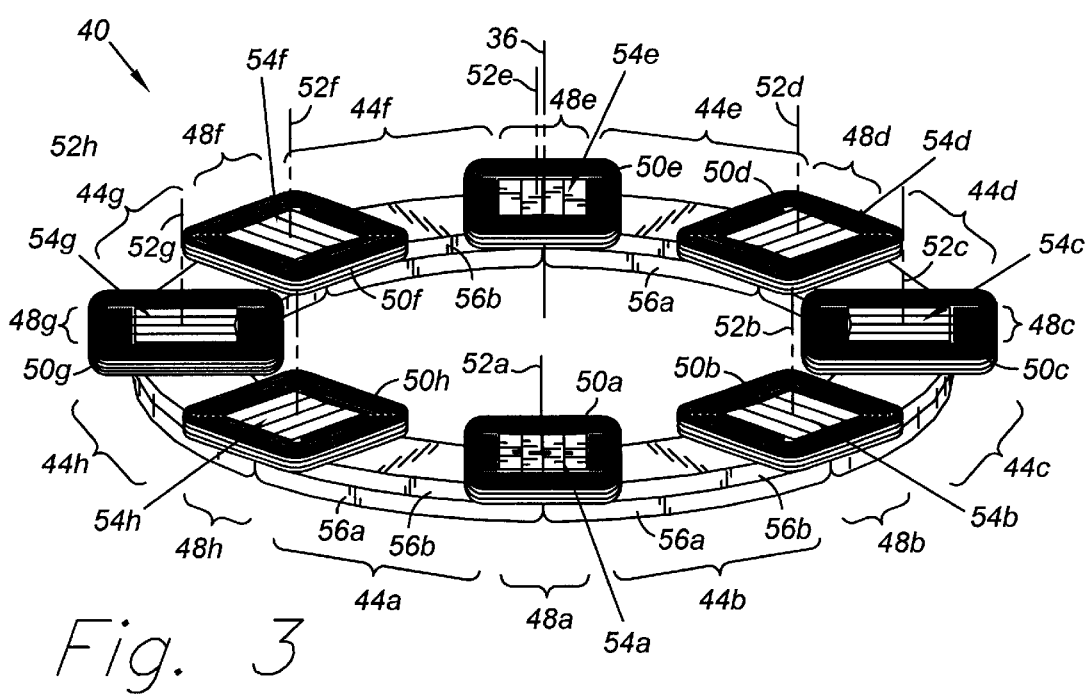
FIG. 3 is a perspective view of the stator rim of FIG. 2 as shown in connection with a plurality of windings.
Figure 4:
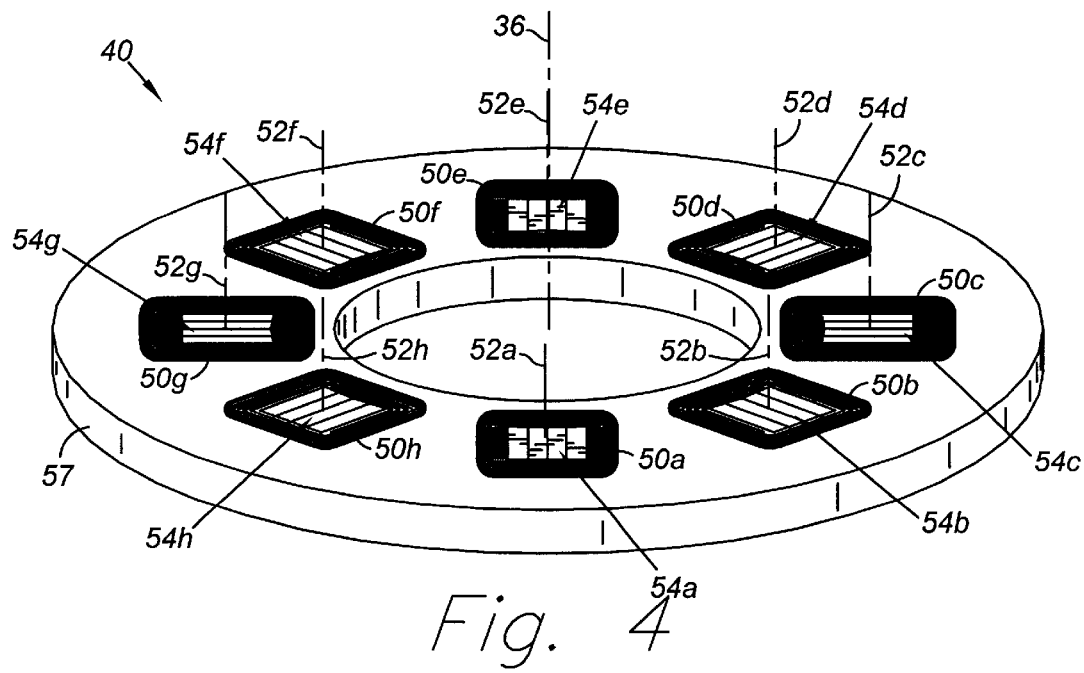
FIG. 4 is a perspective view of the stator rim of FIG. 3 as shown with molding.

Referring now to the drawings wherein the showings are for purposes of illustrating preferred embodiments of the present invention only, and not for purposes of limiting the same, FIGS. 1–9 illustrate a disk drive 10 in accordance with the aspects of the present invention.

Figure 5:
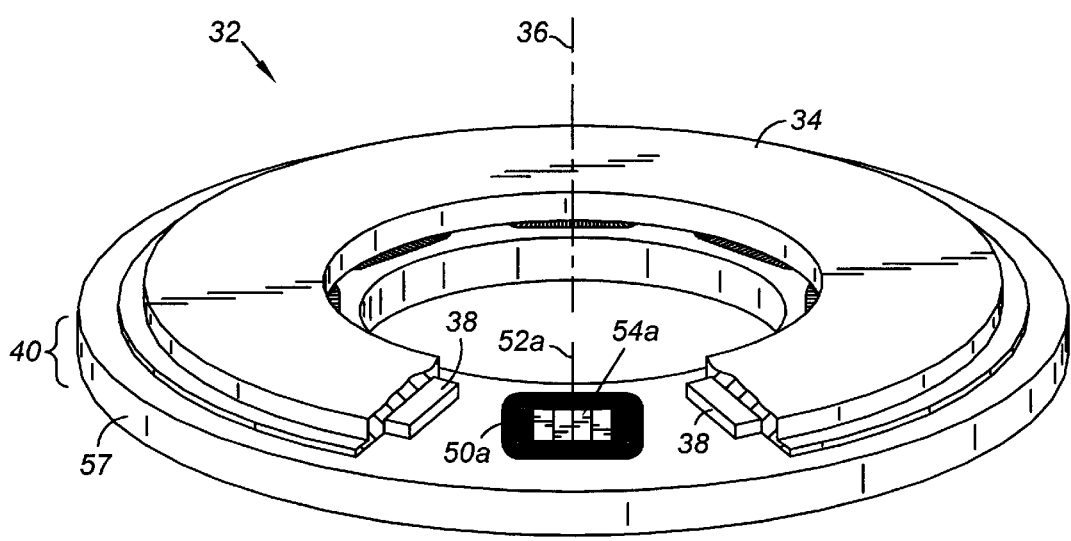
FIG. 5 is a perspective view of a spindle motor according to an aspect of the present invention including the stator rim of FIG. 4 and a spindle motor hub and magnet element.
Figure 6:
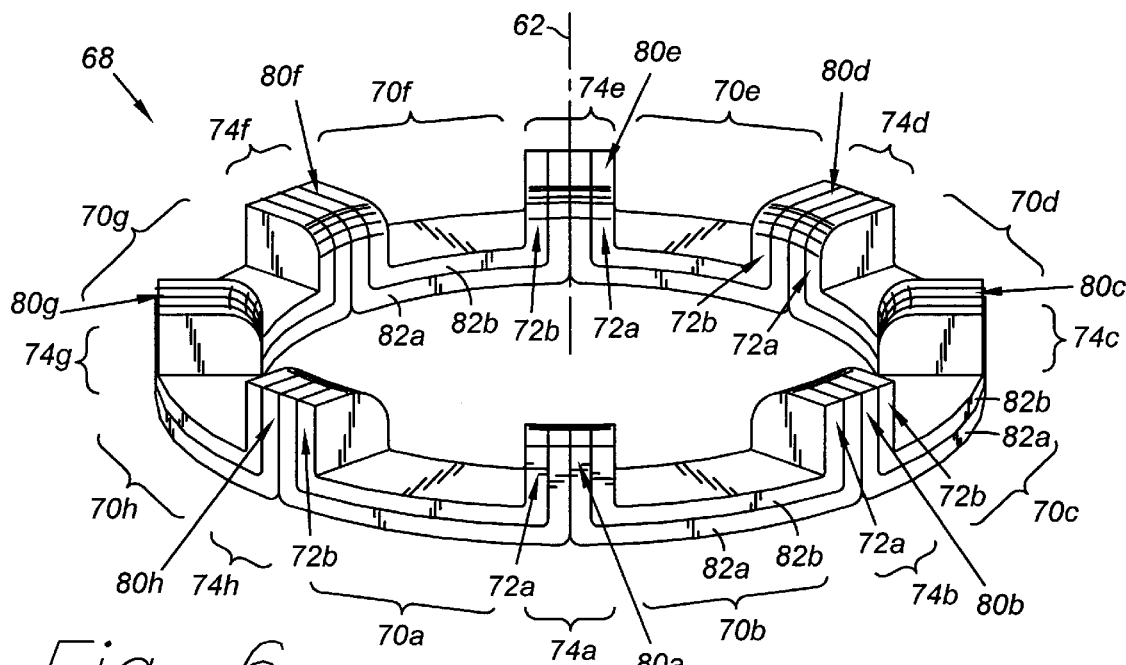
FIG. 6 is a perspective view of another stator rim having curved stator teeth as constructed in accordance with another aspect of the present invention.
Figure 7:
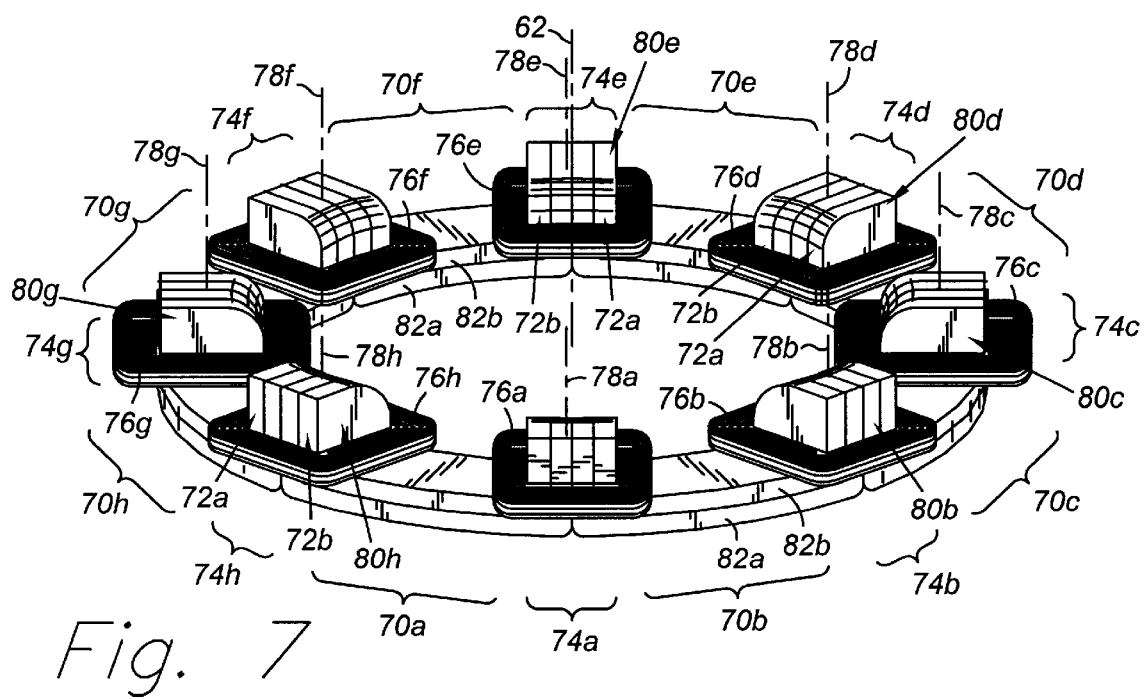
FIG. 7 is a perspective view of the stator rim of FIG. 6 as shown in connection with a plurality of windings.
Figure 8:
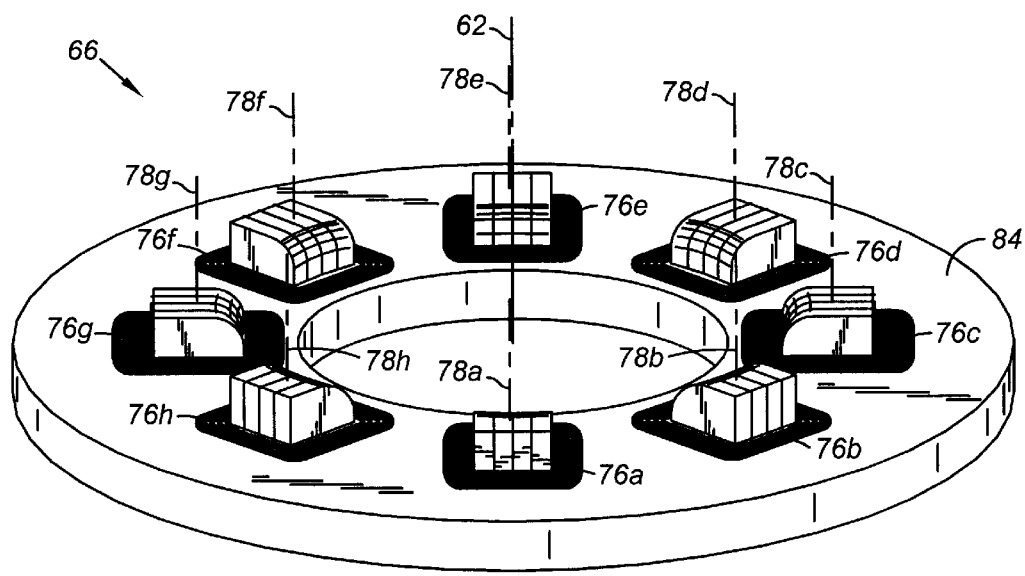
FIG. 8 is a perspective view of the stator rim of FIG. 7 as shown with molding.
Figure 9:
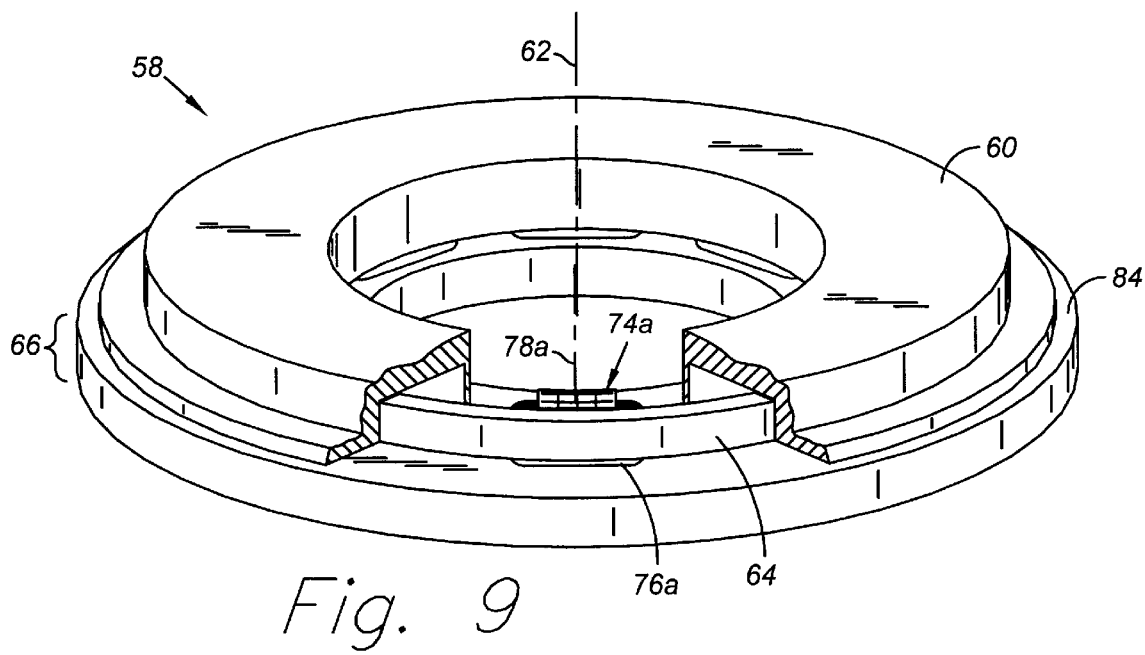
FIG. 9 is a perspective view of a spindle motor according to an aspect of the present invention including the stator rim of FIG. 8 and a spindle motor hub and magnet element.

Referring now to FIG. 1 there is depicted an exploded perspective view a disk drive 10 constructed in accordance with an aspect of the present invention. The disk drive 10 includes a head disk assembly (HDA) 12 and a printed circuit board assembly (PCBA) 14. The head disk assembly 12 includes a disk drive base 16 and a cover 18 that collectively house at least one magnetic disk 20 (although single disk 20 is shown, multiple disks 20 may be included). The disk 20 contains a plurality of tracks 22 for reading and writing data. The head disk assembly 12 further includes a spindle motor of the present invention (such as shown in FIGS. 5 and 9 respectively denoted as 32 and 58) for rotating the disk 20 and a head stack assembly 22. In this regard, FIGS. 2–9 depict various different embodiments of the spindle motor. A pivot cartridge 24 is provided for pivoting the head stack assembly 22 relative to the rotating disk 20 for reading and writing data to and from the disk 20. As shown in FIG. 1, the spindle motor includes a spindle motor hub 26 and an annular magnet element 28 disposed about the hub 26. The hub 26 has an annular flange 30 which is configured to support the disk 20. As FIGS. 2–9 depict various embodiments of the spindle motor, FIGS. 2–9 depict spindle motor hubs denoted 34 and 60 and magnet elements 38 and 64 as incorporated in such specific embodiments. Such hubs 34 and 60 are similar in function to hub 26 of FIG. 1.

Referring now to FIGS. 2–5 there is depicted a spindle motor 32 for use in a disk drive 10 according to an aspect of the present invention. The spindle motor 32 includes a spindle motor hub 34 having an axis of rotation 36. The spindle motor 32 further includes an annular magnet element 38 coupled to the spindle motor hub 34. The spindle motor 32 further includes a spindle motor stator 40. The spindle motor stator 40 includes a stator rim 42 formed of a plurality of adjacent arc segments 44a–h. The arc segments 44a–h each respectively has opposing curved ends 46a–b extending parallel to the axis of rotation 36. The curved ends 46a–b of respective adjacent arc segments 44a–h cooperatively form a plurality of stator teeth 48a–h in operable communication with the magnet element 38 for rotating the spindle motor hub 34. The spindle motor stator 40 further includes a plurality of windings 50a–h distributed along the stator rim 42. The windings 50a–h each has a winding axis 52a–h disposed parallel to the axis of rotation 36 and is disposed about respective ones of the stator teeth 48a–h.

Advantageously, due to the particular orientation of the magnetic flux surfaces 54a–h, the surface area of each of the magnetic flux surfaces 54a–h may be increased without impacting the overall height of the spindle motor 32. Stated otherwise, utilization of such horizontal orientation of the magnetic flux surfaces 54a–h may facilitate an overall reduction of the height of the spindle motor 32 in comparison of prior art spindle motor configurations. Moreover, the magnet element 38 may be disk-shaped which further facilitates a reduction of the height of the spindle motor 32.

As mentioned above, the curved ends 46a–b of respective adjacent arc segments 44a–h cooperatively form a plurality of stator teeth 48a–g. In this regard for example, the curved end 46b of arc segment 44a and the curved end 46a of arc segment 44b cooperatively form the stator tooth 48a. As such, each of the stator teeth 48a–g is of at least a two-layer construction. Each of the stator teeth 48a–h has a respective one of the magnetic flux surfaces 54a–h. In this embodiment, the magnetic flux surfaces 54a–h are each disposed with the associated winding axis 52a–h extending orthogonally from each of the magnetic flux surfaces 54a–h. The magnetic flux surfaces 54a–h are configured to face the magnet element 38 which is disposed above. Thus in practice, magnetic flux lines flow vertically from the magnetic flux surfaces 54 to the magnet element 38. It is contemplated that the layered nature of the stator teeth 48a–h mitigates the development of eddy currents. Eddy currents undesirably reduce the magnetic flux associated with the stator motor 32 and produce excessive heat in the spindle motor 32. In addition, each of the arc segments 44a–h may be formed of at least two laminate layers 56a–b. The laminate layers 56a–b are stacked along the axis of rotation 36. This additional layering further amplifies the eddy current mitigation effect.

In fabricating the stator rim 42, the various laminate layers 56a–b may be individually stamped, and a bending operation may be performed to produce the curved ends 46a–b. Subsequently, the laminate layers 56a–b may be stacked to form each of the arc segments 44a–h. Once the arc segments 44a–h are produced then the arc segments 44a–h may be glued together to formed the circular stator rim 42. In this regard, costly machining processes may be avoided. The windings 50a–h may then be affixed about the newly formed stator teeth 48a–g.

In addition, the stator rim 42 may include molding 57 which is formed about the arc segments 44a–h and the windings 50a–h. Such molding 57 may be formed of a plastic material for example. The molding 57 may be utilized to lock the windings 50a–h in place, as well as associated wire connections. Further, the molding 57 may be shaped to conform to the disk drive base 16 for ease of attachment thereto. In another arrangement, the windings 50a–h may be integrated with a flex circuit material and take the form of a laminate placed upon the stator rim 42.

Referring now to FIGS. 6–9 there is depicted a spindle motor 58 for use in a disk drive 10 according to another aspect of the present invention. The spindle motor 58 includes a spindle motor hub 60 having an axis of rotation 62. The spindle motor 58 further includes an annular magnet element 64 coupled to the spindle motor hub 60. The spindle motor 58 further includes a spindle motor stator 66. The spindle motor stator 66 includes a stator rim 68 formed of a plurality of adjacent arc segments 70a–h. The arc segments 70a–h each respectively has opposing curved ends 72a–b extending parallel to the axis of rotation 62. The curved ends 46a–b of respective adjacent arc segments 44a–h cooperatively form a plurality of stator teeth 74a–h in operable communication with the magnet element 64 for rotating the spindle motor hub 60. The spindle motor stator 66 further includes a plurality of windings 76a–h distributed along the stator rim 68. The windings 76 each have a winding axis 78a–h parallel to the axis of rotation 62 and being disposed about respective ones of the stator teeth 74a–h.

In this embodiment, the magnet element 38 is disposed concentrically about the stator teeth 74a–h. The magnet element 64 may be cylindrical-shaped or ring-shaped. Each of the stator teeth 74a–h respectively has a magnetic flux surface 80a–h with the associated winding axis 78a–h extending parallel to each magnetic flux surface 80a–h. The magnetic flux surfaces 80a–h are configured to face radially with respect to the axis of rotation 62. As such, the magnet element 38 and the magnetic flux surfaces 80a–h face each other. Preferably, the curved ends 72a–b which form the stator teeth 74 are rounded towards the magnetic flux surfaces 80a–h as shown. In practice, as magnetic flux tends to travel along pathways of least magnetic resistance, it is contemplated that magnetic flux lines extend from the magnetic flux surfaces 80a–h to the magnet element 64 (i.e., in radial directions relative to the axis of rotation 62). In an alternate configuration, it is contemplated that the stator teeth 74a–h may be disposed cooperatively about the magnet element 64 (i.e., the magnet element 64 is disposed within the stator teeth 74a–h. However, by configuring the magnet element 64 about the stator teeth 74a–h, the overall sizing of the magnet element and the radial distance of the magnet element 64 are comparatively increased. This comparatively increases the magnetic torque produced by the spindle motor 58.

In addition, each of the arc segments 70a–h may be formed of at least two laminate layers 82a–b. The laminate layers 82a–b are stacked along the axis of rotation 62. This additional layering further amplifies the eddy current mitigation effect. Further, the stator rim 68 may include molding 84.

We claim:

1. A spindle motor for use in a disk drive, the spindle motor comprising:
   a spindle motor hub having an axis of rotation;
   an annular magnet element coupled to the spindle motor hub; and
   a spindle motor stator including:
      a stator rim formed of a plurality of adjacent arc segments, the arc segments each respectively having opposing curved ends extending parallel to the axis of rotation, the curved ends of respective adjacent arc segments cooperatively forming a plurality of stator teeth in operable communication with the magnet element for rotating the spindle motor hub; and
      a plurality of windings distributed along the stator rim, the windings each having a winding axis parallel to the axis of rotation and being disposed about respective ones of the stator teeth.

2. The stator motor of claim 1 wherein each of the stator teeth has a magnetic flux surface disposed with the associated winding axis extending orthogonally from each magnetic flux surface.

3. The stator motor of claim 2 wherein the magnet element is disk-shaped.

4. The stator motor of claim 1 wherein each of the stator teeth has a magnetic flux surface with the associated winding axis extending parallel to each magnetic flux surface.

5. The stator motor of claim 4 wherein the magnet element is disposed concentrically about the stator teeth.

6. The stator motor of claim 4 wherein the stator teeth are disposed cooperatively about the magnet element.

7. The stator motor of claim 4 wherein the magnet element is cylindrical-shaped.

8. The stator motor of claim 4 wherein the magnet element is ring-shaped.

9. The stator motor of claim 4 wherein the curved ends of the arc segments which formed the stator teeth are rounded towards respective ones of the magnetic flux surfaces.

10. The stator motor of claim 1 wherein each of the arc segments is formed of at least two laminate layers, the laminate layers are stacked along the axis of rotation.

11. A disk drive comprising:
    a disk drive base;
    a spindle motor attached to the disk drive base including:
       a spindle motor hub having an axis of rotation;
       an annular magnet element coupled to the spindle motor hub; and
       a spindle motor stator including:
          a stator rim formed of a plurality of adjacent arc segments, the arc segments each respectively having opposing curved ends extending parallel to the axis of rotation, the curved ends of respective adjacent arc segments cooperatively forming a plurality of stator teeth in operable communication with the magnet element for rotating the spindle motor hub; and
          a plurality of windings distributed along the stator rim, the windings each having a winding axis parallel to the axis of rotation and being disposed about respective ones of the stator teeth.

12. The disk drive of claim 11 wherein each of the stator teeth has a magnetic flux surface disposed with the associated winding axis extending orthogonally from each magnetic flux surface.

13. The disk drive of claim 12 wherein the magnet element is disk-shaped.

14. The disk drive of claim 11 wherein each of the stator teeth has a magnetic flux surface with the associated winding axis extending parallel to each magnetic flux surface.

15. The disk drive of claim 14 wherein the magnet element is disposed concentrically about the stator teeth.

16. The disk drive of claim 14 wherein the stator teeth are disposed cooperatively about the magnet element.

17. The disk drive of claim 14 wherein the magnet element is cylindrical-shaped.

18. The disk drive of claim 14 wherein the magnet element is ring-shaped.

19. The disk drive of claim 14 wherein the curved ends of the arc segments which formed the stator teeth are rounded towards respective ones of the magnetic flux surfaces.

20. The disk drive of claim 11 wherein each of the arc segments is formed of at least two laminate layers, the laminate layers are stacked along the axis of rotation.

* * * * *